(12) United States Patent
Bang et al.

(10) Patent No.: US 9,143,796 B2
(45) Date of Patent: Sep. 22, 2015

(54) MULTI-VIEW VIDEO CODING/DECODING METHOD AND APPARATUS

(75) Inventors: Gun Bang, Daejeon (KR); Gi-Mun Um, Daejeon (KR); Taeone Kim, Daejeon (KR); Eun-Young Chang, Daejeon (KR); Namho Hur, Daejeon (KR); Jin-Woong Kim, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 358 days.

(21) Appl. No.: 13/133,576

(22) PCT Filed: Dec. 8, 2009

(86) PCT No.: PCT/KR2009/007328
§ 371 (c)(1),
(2), (4) Date: Jun. 8, 2011

(87) PCT Pub. No.: WO2010/068020
PCT Pub. Date: Jun. 17, 2010

(65) Prior Publication Data
US 2011/0261883 A1    Oct. 27, 2011

(30) Foreign Application Priority Data

Dec. 8, 2008 (KR) .................. 10-2008-0124321
Apr. 28, 2009 (KR) .................. 10-2009-0037007

(51) Int. Cl.
*H04N 7/12* (2006.01)
*H04N 5/228* (2006.01)
(Continued)

(52) U.S. Cl.
CPC .............. *H04N 19/46* (2014.11); *H04N 19/52* (2014.11); *H04N 19/597* (2014.11)

(58) Field of Classification Search
CPC .............. H04N 19/00769; H04N 7/50; H04N 7/26148; H04N 7/26351; H04N 7/26244; H04N 7/26271; H04N 7/26015; H04N 7/26031; H04N 5/232; H04N 5/2351; H04N 5/2352; H04N 2101/00; G06T 9/00
USPC ........... 375/240.13, 240.12–240.16; 348/22.1
See application file for complete search history.

(56) References Cited

U.S. PATENT DOCUMENTS 6,384,859 B1    5/2002 Matsumoto et al.
2006/0120459 A1*    6/2006 Park et al. ................ 375/240.17
(Continued)

FOREIGN PATENT DOCUMENTS

CN    101222639    7/2008
KR    10-0414629    5/2004
(Continued)

OTHER PUBLICATIONS

International Search Report and Written Opinion for Application No. PCT/KR2009/007328, dated Jun. 20, 2011.

*Primary Examiner* — Dave Czeka
*Assistant Examiner* — Tsion B Owens
(74) *Attorney, Agent, or Firm* — Nelson Mullins Riley & Scarborough LLP; Anthony A. Laurentano, Esq.

(57) ABSTRACT

Provided is a multi-view video coding/decoding method and apparatus which uses coded and decoded multi-view videos to code and decode depth information videos corresponding to the multi-view videos. The multi-view video coding method includes: controlling the scales of first and second depth information videos corresponding to a multi-view video such that the scales are equalized; and coding the second depth information video, of which the scale is controlled, by referring to the first depth information video of which the scale is controlled.

10 Claims, 7 Drawing Sheets

(51) Int. Cl.
*H04N 19/46* (2014.01)
*H04N 19/597* (2014.01)
*H04N 19/52* (2014.01)

(56) References Cited

U.S. PATENT DOCUMENTS

| | | |
|---|---|---|
| 2006/0153300 A1* | 7/2006 | Wang et al. ............... 375/240.16 |
| 2007/0030356 A1 | 2/2007 | Yea et al. |
| 2007/0146606 A1 | 6/2007 | Yamashita |
| 2007/0177671 A1 | 8/2007 | Yang |
| 2008/0253671 A1 | 10/2008 | Choi et al. |
| 2010/0008422 A1 | 1/2010 | Shimizu et al. |
| 2010/0165077 A1* | 7/2010 | Yin et al. .......................... 348/42 |
| 2010/0316362 A1* | 12/2010 | Jeon et al. ..................... 386/355 |
| 2011/0222602 A1* | 9/2011 | Sung et al. ............... 375/240.12 |

FOREIGN PATENT DOCUMENTS

| | | |
|---|---|---|
| KR | 1020070070015 | 7/2007 |
| KR | 1020080006495 | 1/2008 |
| KR | 1020080081407 | 9/2008 |
| KR | 1020080092210 | 10/2008 |
| WO | 2007/011147 A1 | 1/2007 |
| WO | 2007/047736 A2 | 4/2007 |
| WO | 2007/114608 A1 | 10/2007 |
| WO | 2008/053758 A1 | 5/2008 |
| WO | 2008088175 A1 | 7/2008 |
| WO | 2008/108566 A1 | 9/2008 |
| WO | 2008/133455 A1 | 11/2008 |
| WO | 2009/091383 A2 | 7/2009 |

* cited by examiner

MULTI-VIEW VIDEO CODING/DECODING METHOD AND APPARATUS

RELATED APPLICATIONS

This application is a 35 U.S.C. §371 national stage filing of PCT Application No. PCT/KR2009/007328 filed on Dec. 8, 2009, which claims priority to, and the benefit of, Korean Patent Application No. 10-2008-0124321 filed Dec. 8, 2008 and Korean Patent Application No. 10-2009-0037007 filed on Apr. 28, 2009. The contents of the aforementioned applications are hereby incorporated by reference.

TECHNICAL FIELD

Exemplary embodiments of the present invention relate to a multi-view video coding/decoding method and apparatus which uses coded and decoded multi-view videos to code and decode depth information videos corresponding to the multi-view videos.

BACKGROUND ART

Recently, research for broadcasting multi-view videos through a Digital Television (DTV) has been conducted. To broadcast multi-view videos similar to actual videos seen with human eyes, the multi-view videos should be created and transmitted. Then, the multi-view videos should be received and reproduced by a display apparatus. However, since the multi-view videos have a large amount of data, it is difficult to receive the multi-view videos at the bandwidth of channels used in a current digital broadcasting system. Accordingly, research is being conducted on a technology for coding and decoding multi-view videos.

Multi-view Video Coding (MVC) is a technology which codes a plurality of videos acquired from a plurality of cameras having different views and a plurality of depth information videos corresponding to the plurality of videos, that is, multi-view videos. For an identical object, the plurality of cameras are disposed so as to be spaced from each other in accordance with predetermined rules in distance and direction. As a result, a high correlation exists between the respective videos having different views and composing the multi-view videos. When the high correlation between the respective videos is properly used, it is possible to remarkably improve the coding efficiency of the MVC. However, since lights reflected from the identical object may differ from each other depending on directions, the lights may be considered to maximize the coding efficiency.

The MVC of which the standardization is being actively conducted is based on H.264/MPEG part 10 Advanced Video Coding (hereafter, referred to as H.264/AVC), which is an existing international moving picture coding standard. In the MVC, the above-described characteristics of the multi-view video are considered to find a method for improving the coding efficiency. For example, a hierarchical B-pictures coding process, which is performed to support temporal scalability in Joint Scalable Video Coding (JSVC) defined in the H.264/AVC, is applied to intra-view prediction coding. Furthermore, the inter-view prediction coding is performed side by side with the intra-view prediction coding to improve the coding efficiency in the MVC. Accordingly, much research on reception and transmission of three-dimensional (3D) videos through the DTV broadcasting is being conducted by the associated groups which research 3D videos. Currently, the research is aiming at the transmission and reception of High Definition (HD) stereo videos. The HD stereo video refers to an interlaced video having a size of 1920×1080 or a progressive video having a size of 1024×720.

FIG. 1 is a block diagram explaining a conventional multi-view video coding/decoding system.

Referring to FIG. 1, the conventional multi-view video coding/decoding system includes a first video coding unit 101, a first video decoding unit 103, a first depth information video coding unit 105, a first depth information video decoding unit 107, a second video coding unit 109, a second video decoding unit 111, a second depth information video coding unit 113, and a second depth video information decoding unit 115.

First and second videos and first and second depth information videos are inputted to the first and second video coding units 101 and 109 and the first and second depth information video coding units 105 and 113, respectively. The first and second videos have a different view from each other, and the first and second depth information videos correspond to the first and second videos, respectively, and include depth information. In the conventional multi-view video coding/decoding system, two or more videos may be used, and the number of depth information videos may correspond to the number of videos. At this time, multi-view videos may be coded using videos having different views. That is, a high correlation exists between the multi-view videos. Therefore, when the first video is first coded, the second video coding unit 109 may code the second video by referring to the coded first video. The depth information video may be coded in the same manner.

The respective coded videos are inputted to the first and second video decoding units 103 and 111 and the first and second depth information video decoding units 107 and 115, and then decoded.

A two-dimensional (2D) video is a video obtained by decoding the coded first or second video, and a 3D video is a video obtained by decoding the coded first and second videos and the coded first depth information video. The first video may be a video having a reference view. A multi-view video is a video obtained by decoding the coded first and second videos and the coded first and second depth information videos.

That is, in the conventional multi-view video coding/decoding system, the coding and decoding of the multi-view video and the depth information video are performed independently.

DISCLOSURE

Technical Problem

An embodiment of the present invention is directed to a multi-view video coding/decoding method and apparatus which effectively codes and decodes a depth information video corresponding to a multi-view video, thereby effectively coding and decoding the multi-view video.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, a multi-view video coding method includes: coding a multi-view video by performing inter and intra predictions; and coding a depth information video corresponding to the multi-view video in accordance with at least one of the inter prediction and the intra prediction.

In accordance with another embodiment of the present invention, a multi-view video coding method includes: controlling the scales of first and second depth information videos corresponding to a multi-view video such that the scales are equalized; and coding the second depth information video, of which the scale is controlled, by referring to the first depth information video of which the scale is controlled.

In accordance with another embodiment of the present invention, a multi-view video coding apparatus includes: a video coding block configured to code a multi-view video through inter and intra predictions; and a depth information video coding block configured to code a depth information video corresponding to the multi-view video using one or more pieces of inter prediction information and intra prediction information generated by the video coding block.

In accordance with another embodiment of the present invention, a multi-view video coding apparatus includes: a scale control block configured to control the scales of first and second depth information videos corresponding to multi-view videos such that the scales are equalized to each other; and a depth information video coding block configured to code the second depth information video, of which the scale is controlled, by referring to the first depth information video of which the scale is controlled.

In accordance with another embodiment of the present invention, a multi-view video decoding method includes: receiving a multi-view video coded through inter and intra predictions and a depth information video which is coded by using one or more pieces of prediction information in accordance with the inter prediction and prediction information in accordance with the intra prediction; decoding the coded multi-view video; and decoding the coded depth information video using the prediction information used during the coding of the depth information video.

Advantageous Effects

In accordance with the embodiments of the present invention, when the depth information video for the multi-view video is coded, the coding may be performed by using the prediction information generated during the coding of the multi-view video, which makes it possible to increase the coding efficiency. Furthermore, the prediction information used during the decoding of the multi-view video may be used during the decoding of the depth information video. Therefore, it is possible to increase the decoding efficiency for the multi-view video.

BEST MODE

Figure 1:
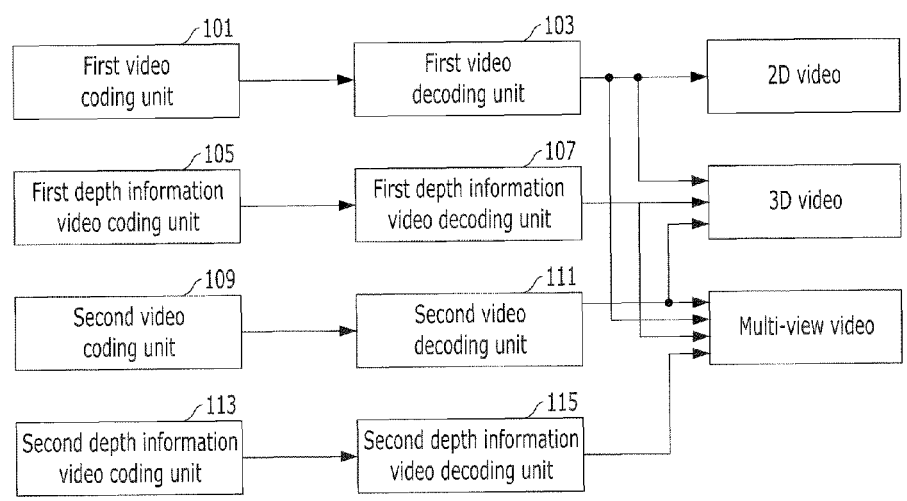
FIG. 1 is a block diagram explaining a conventional multi-view video coding/decoding system.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Figure 2:
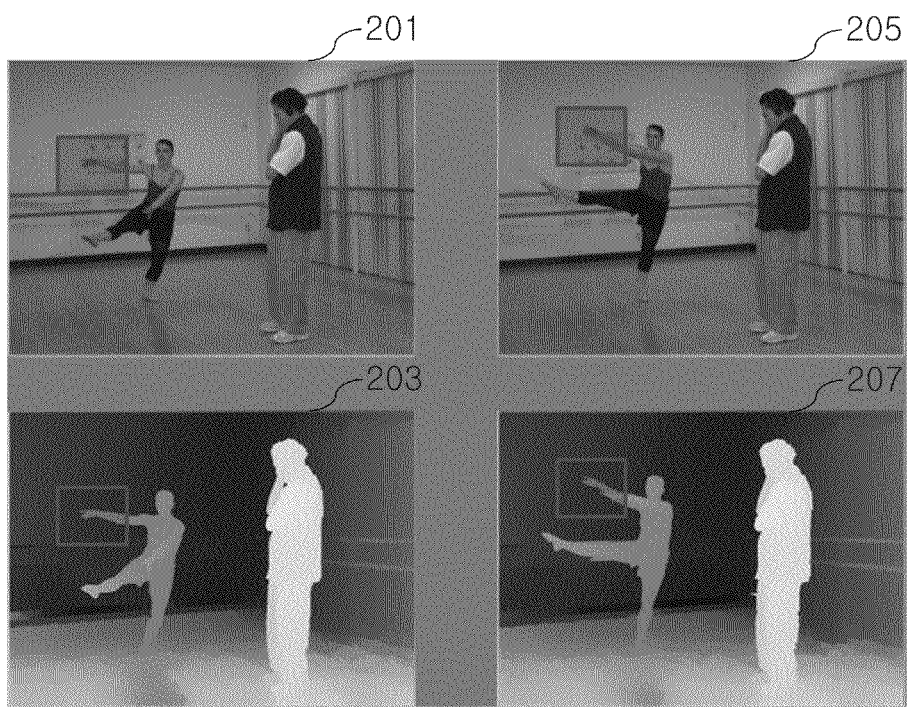
FIG. 2 shows videos explaining the concept of a multi-view video coding method in accordance with an embodiment of the present invention.

FIG. 2 shows videos explaining the concept of a multi-view video coding method in accordance with an embodiment of the present invention.

In FIG. 2, a first depth information video 203 corresponds to a first video 201, and a second depth information video 207 corresponds to a second video 205. The first and second videos 201 and 205 were taken by the same camera, and are videos for different frames having a temporal difference.

Referring to FIG. 2, the first video 201 and the first depth information video 203 and the second video 205 and the second depth information video 207, respectively, have similarities in the contours of objects and the motions of the objects at a time axis. This is because depth information is obtained by expressing a distance between the objects of the video and the camera in figures, and the depth information video represents the depth information.

In particular, the object contours in the video and the depth information video during the coding are closely related to in-frame prediction modes in accordance with intra prediction, and the object motions are closely related to motion vectors. That is, when a video and a depth information video corresponding to the video are coded, it is highly likely that the prediction mode and the motion vector in the video are similar to those in the depth information video. Therefore, the coding of the video and the depth information video is not independently performed, but is performed using the similarity between the video and the depth information video, which makes it possible to increase coding efficiency. That is, when the coding of the multi-view video is performed through prediction information generated during the coding of the video when the depth information video is coded, the entire coding amount may decrease to increase the coding efficiency. The prediction information includes prediction modes and motion vectors. This principle may be extended to the multi-view video.

Figure 3:
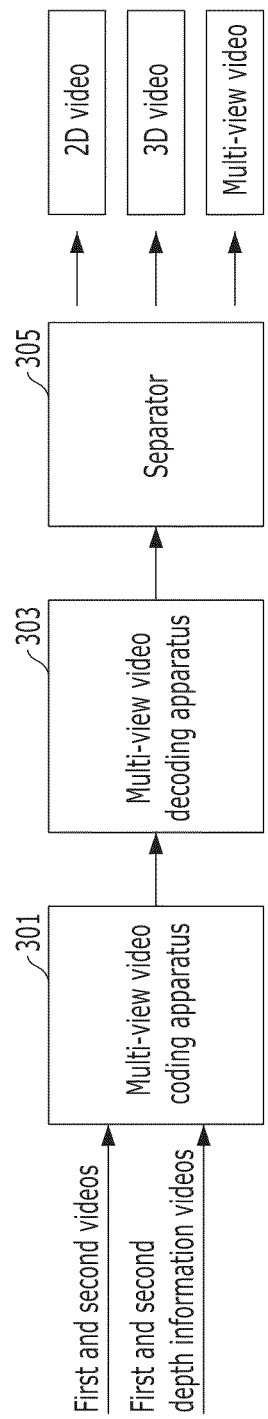
FIG. 3 is a diagram explaining a multi-view video coding/decoding system in accordance with another embodiment of the present invention.

FIG. 3 is a diagram explaining a multi-view video coding/decoding system in accordance with another embodiment of the present invention.

Referring to FIG. 3, the multi-view video coding and decoding system in accordance with the embodiment of the present invention includes a multi-view video coding apparatus 301 and a multi-view video decoding apparatus 303. FIG. 3 illustrates a case in which first and second videos and first and second depth information videos corresponding to the first and second videos, respectively, are coded and decoded.

The multi-view video coding apparatus 301 receives and codes the first and second videos and the first and second depth information videos. The first and second videos are multi-view videos taken by cameras having a different view from each other, and the first and second depth information videos may be acquired by a stereo matching or depth camera.

The multi-view video coding apparatus 301 codes the multi-view videos, that is, the first and second videos and the first and second depth information videos through inter and intra predictions. At this time, the multi-view video coding apparatus 301 may code a depth information video corresponding to a video using one or more pieces of prediction information in accordance with the inter prediction and prediction information in accordance with the intra prediction, which are generated during the coding of the video. The prediction information may include a motion vector of the video in accordance with the inter prediction and a prediction mode of the video in accordance with the intra prediction.

As described above in FIG. 2, the motion vector and the prediction mode of the video are similar to those of the depth information video. Therefore, the multi-view video coding apparatus 301 may code the depth information video using one or both of the motion vector and the prediction mode of the video. The multi-view video coding apparatus 301 may transmit the coded video and the coded depth information video as one bit stream.

The multi-view video decoding apparatus 303 receives the coded video and the coded depth information video from the multi-view video coding apparatus 301, and then decodes the received videos. The multi-view video decoding apparatus 303 decodes the coded depth information video using the prediction information used during the coding of the multi-view video. Since the multi-view video coding apparatus 301 codes the depth information video using the prediction information of the multi-view video, the coded depth information video needs to be decoded by using the prediction information of the multi-view video. In this case, the information that the prediction information of the multi-view video was used during the coding of the depth information video may be included in a bit stream generated by the multi-view video coding apparatus 301 and then provided to the multi-view video decoding apparatus 303, or separately provided to the multi-view video decoding apparatus 303.

Both of the multi-view video coding apparatus 301 and the multi-view video decoding apparatus 303 may perform the coding and the decoding in accordance with the H.264/AVC standard, respectively.

The multi-view video coding/decoding system may include a separator 303. The separator 303 separates the decoded first and second videos and the decoded first and second depth information videos such that the separated videos may be used for reproducing 2D, 3D, or multi-view videos.

Furthermore, the multi-view video coding apparatus 301 may code a video and a depth information video which have a different view from the previously coded video and depth information video, using the previously coded video and depth information video. In particular, when coding the depth information video having a different view from the previously coded depth information video by referring to the previously coded depth information video, the multi-view video coding apparatus 301 in accordance with the embodiment of the present invention may perform the coding by controlling a scale between the depth information videos. This will be described below in detail with reference to FIG. 5.

Figure 4:
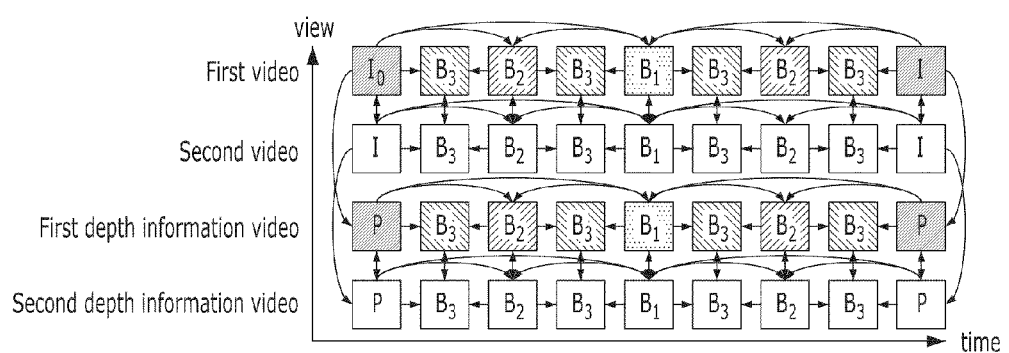
FIG. 4 is a diagram explaining a process in which prediction information is used in a multi-view video coding apparatus 301 in accordance with the embodiment of the present invention.

FIG. 4 is a diagram explaining a process in which the prediction information is used in the multi-view video coding apparatus 301 in accordance with the embodiment of the present invention.

Referring to FIG. 4, the videos and the depth information videos include I frames, P frames, and B frames. In the I frame, the coding through the intra prediction is performed. Random access to a moving picture may be performed through the I frame. The P frame estimates a motion vector in a single direction with a previously coded I frame or P frame set to a reference video, and the B frame estimates a motion vector in both directions using the I frame, the P frame, and the B frame. That is, in the P and B frames, the coding through the inter prediction is performed. In FIG. 4, arrows indicate reference frames.

The intra prediction is a coding technology based on a high correlation between the gray levels of adjacent pixels in a single frame. In the intra prediction, a reference frame is not used to code a block of a current frame, but a previously coded area of the current frame which is to be coded is used to calculate a prediction value of the current block. The intra prediction mode is divided into a 4×4 luma intra prediction mode, an 8×8 luma intra prediction mode, and a 16×16 luma intra prediction mode, and a chroma intra prediction mode. The intra prediction is performed on the current block depending on the variety of intra prediction modes, that is, various sizes and various intra prediction directions, and a prediction value is generated in accordance with the optimal intra prediction mode selected among them. When the prediction value is generated, information on a residue and the prediction mode is coded to increase the compression rate of the video coding. The residue is a difference between the pixel value and the prediction value of the current block.

The inter prediction is a coding technology based on the similarities between consecutive frames in a video sequence. One or more reference frames are used to estimate and compensate for the motion of a current frame by the unit of block, in order to code a video. In the reference frames, a similar block to the current frame is searched for, and a motion vector is extracted. The residue between the current block and the similar block in the reference frames is coded to increase the compression rate of the video coding. At this time, the motion vector is needed to decode the video coded in accordance with the inter prediction. Therefore, the motion vector is coded together.

In accordance with the embodiment of the present invention, when a depth information video is coded, the prediction information in accordance with the coding of the video is used. That is, as illustrated in FIG. 4, the I frame of the depth information video may be coded by using the prediction information in accordance with the coding of the I frame of the video. Furthermore, the B and P frames of the depth information video may be coded by using the prediction information in accordance with the coding of the B and P frame of the video. In this case, when the depth information video is coded, the coding may be performed without including the information on the prediction mode or the motion vector. Therefore, the coding efficiency may increase.

That is, when the depth information video is coded, a flag bit is inserted, which includes such information that the prediction information in accordance with the coding of the video is used. Then, when the coded depth information video is decoded, the flag bit may be used to use the decoding information of the video. Therefore, the prediction mode and the motion vector in accordance with the coding of the depth information video may not be coded. Since the information amount of the flag bit is smaller than those of the prediction mode and the motion vector in accordance with the coding of the depth information video, the coding efficiency may increase.

At this time, the video may be coded in advance of the depth information video. Furthermore, since the similarities between the video and the depth information video are used, the depth information video may be coded by using the prediction information on the same view and the same frame.

Meanwhile, as illustrated in FIG. 4, when a video is coded, a frame of a video having a different view may be referred to. Furthermore, when a depth information video is coded, a frame of a depth information video having a different view may be referred to. The B and P frames may be coded by referring to the frames of videos having a different view. For example, for the P frame of the second video, the coding in accordance with the inter prediction may be performed by referring to the I frame of the first video. This will be described below in detail with reference to FIG. 6.

Figure 5:
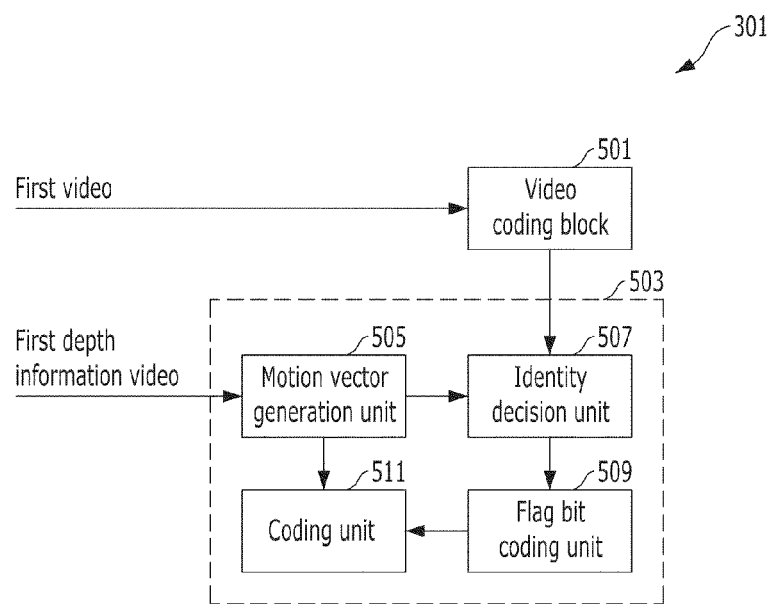
FIG. 5 illustrates a multi-view vide coding apparatus 301 in accordance with another embodiment of the present invention.

FIG. 5 illustrates a multi-view video coding apparatus 301 in accordance with another embodiment of the present invention.

Referring to FIG. 5, the multi-view video coding apparatus 301 in accordance with the embodiment of the present invention includes a video coding block 501 and a depth information video decoding block 503.

The video coding block 501 performs the inter and intra predictions to code multi-view videos. FIG. 5 illustrates a case in which the video coding block 501 codes a first video among multi-view videos.

The depth information video coding block 503 codes a depth information video corresponding to the multi-view video using one or more pieces of prediction information in accordance with the inter and intra predictions. The video coding block 501 codes the first video, and the depth information video coding block 503 codes the first depth information video.

As described above, the prediction information may be a motion vector of the video in accordance with the inter prediction and a prediction mode of the video in accordance with the intra prediction.

More specifically, the depth information video coding block 503 includes a motion vector generation unit 505, an identity decision unit 507, a flag bit coding unit 509, and a coding unit 511.

The motion vector generation unit 505 generates a motion vector for the current frame of the first depth information video using a reference frame. As described above, the motion vector generation unit 505 sets the reference frame with the B and P frames set to the current frame, and generates the motion vector.

The identity decision unit 507 decides whether or not the motion vector for the current frame is identical to the motion vector in accordance with the inter prediction. That is, the identity decision unit 507 compares the motion vector generated by the video coding block 501 with the motion vector generated by the motion vector generation unit 505. As a result, when the identity between the motion vectors is confirmed, the motion vector generated by the video coding block 501 is used during the coding of the depth information video.

The flag bit coding unit 509 generates a flag bit indicating the identity decision result of the identity decision unit 507, and then code the generated flag bit. For example, when the identity is confirmed, the flag bit may indicate '1'. On the other hand, when the identity is not confirmed, the flag bit may indicate '0'.

The coding unit 511 codes the depth information video including the motion vector for the current frame, depending on the flag bit. That is, when the identity is confirmed, the coding unit 511 codes the depth information video including the motion vector for the depth information video. On the other hand, when the identity is not confirmed, the coding unit 511 codes the depth information video excluding the motion vector for the depth information video.

In accordance with the embodiment of the present invention, when the identity is confirmed, only the flag bit may be coded, which has a smaller amount of information amount than the motion vector. Therefore, the coding efficiency may increase. Furthermore, when it is decided that the motion vector generated by the video coding block 501 is identical to the motion vector generated by the motion vector generation unit 505, the motion vector generated by the video coding block 501 may be used to increase the precision of the coding.

In the I frame, the motion vector is not generated, but the coding is performed in accordance with the prediction mode. The multi-view video coding apparatus 301 may code the depth information video using the prediction mode of the video in accordance with the intra mode. More specifically, the flag bit coding unit 509 may further generate and code a flag bit indicating whether or not the video coding block 501 codes the depth information video using the prediction mode used during the intra prediction.

The coding unit 511 may perform the intra prediction in accordance with the prediction mode, and further code the current frame of the depth information video. That is, the coding unit 511 codes the depth information video using the prediction mode within the I frame of the first video, under the precondition that the prediction mode of the I frame of the first video is identical to that of the I frame of the depth information video.

Therefore, since only the flag bit having a smaller information amount than the information of the prediction mode may be coded, the coding efficiency increases. Depending on the design, the multi-view video coding apparatus 301 may code the depth information video using one or both of the prediction mode and the motion vector. Furthermore, when the depth information video coding block 503 codes the depth information video using the motion vector of the video coding block 501, the multi-view video coding apparatus 301 may not decide the identity, but code the depth information video under the precondition that the identity is confirmed.

The inter and intra predictions may be performed depending on macro block types. The multi-view video coding apparatus 301 first decides the identity between the macro block types. When the identity is confirmed, the multi-view video coding apparatus 301 may code the depth information video using the prediction information of the video coding block 501.

Meanwhile, the multi-view video coding apparatus 301 may further include a filter block which is not illustrated. The filter block controls the prediction information such that the prediction information may be used by the depth information video coding block 503, depending on a difference in resolution or frame rate between the video and the depth information video. For example, when the identity decision unit 507 decides the identity between the motion vectors, the filter block may control the scales of the motion vectors inputted to the identity decision unit 507. That is, when the frame rate of the video is different from that of the depth information video, the filter block may perform sub sampling to control the scales of the motion vectors. Alternatively, when the resolution of the video is different from that of the depth information video, the filter block may perform down sampling to control the scales of the motion vectors.

Figure 6:
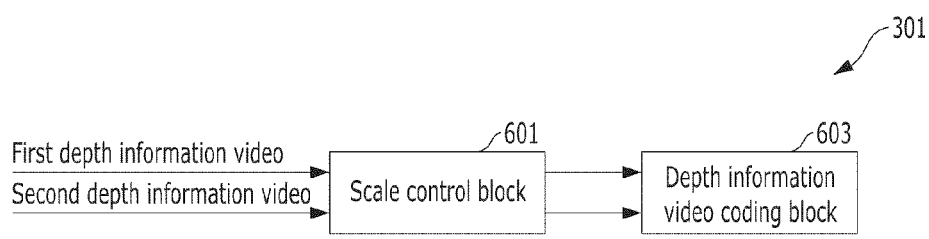
FIG. 6 illustrates a multi-view video coding apparatus 301 in accordance with another embodiment of the present invention.

FIG. 6 illustrates a multi-view video coding apparatus 301 in accordance with another embodiment of the present invention.

Referring to FIG. 6, the multi-view video coding apparatus 301 in accordance with the embodiment of the present invention includes a scale control block 601 and a depth information video coding block 603. FIG. 6 illustrates a case in which first and second depth information videos are coded. The second depth information video is a depth information video corresponding to a video having a different view from the first depth information video.

The scale control block 601 controls the scales of the first and second depth information videos corresponding to the multi-view videos such that the scales are equalized to each other. As described above, the depth information video includes depth information, and the depth information is obtained by expressing the distance between the objects of the video and the camera in figures. Therefore, the depth value between the first and second depth information videos with respect to the same object may exist. That is, a difference in scale may exist. When the first depth information video is referred to during the coding of the second depth information video, the difference in scale between the first and second depth information videos may cause an error. The scale control block 601 may control the scale of the first depth information video on the basis of the second depth information video or control the scales of the first and second depth information videos with the average thereof.

The depth information video coding block 603 codes the second depth information video, of which the scale is controlled, by referring to the first depth information depth image of which the scale is controlled by the scale control block 601. Referring to FIG. 4, when the coding in accordance with the inter prediction is performed on the P frame of the second depth information video, the I frame of the first depth information video may be referred to. Although not illustrated in FIG. 4, when the coding in accordance with the inter prediction is performed on the B frame of the second depth information video, the B frame of the first depth information video may be referred to. At this time, the depth information video coding block 603 may code the second depth information video, of which the scale is controlled, by referring to the first depth information video of which the scale is controlled.

Meanwhile, the multi-view video may be coded by the video coding block 501 illustrated in FIG. 5. Furthermore, the multi-view video coding apparatus 301 including the scale control block 601 and the depth information video coding block 603 in accordance with the embodiment of the present invention may control the scales of two or more depth information videos, and then code the depth information videos.

Figure 7:
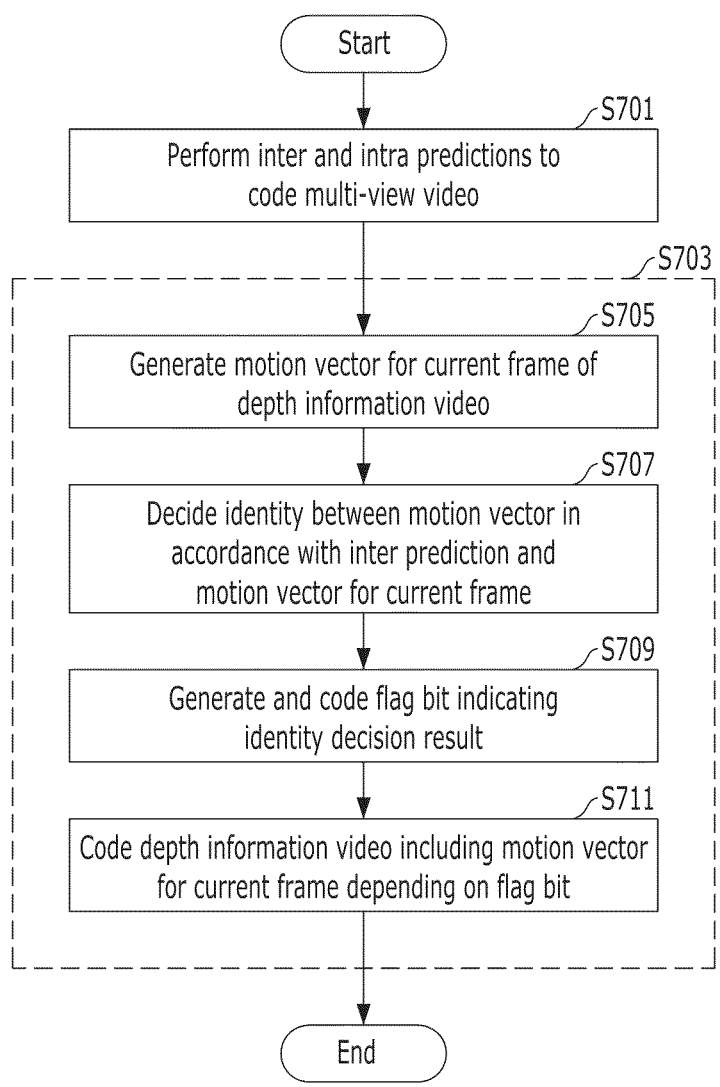
FIG. 7 illustrates a multi-view video coding method in accordance with another embodiment of the present invention.

FIG. 7 illustrates a multi-view video coding method in accordance with another embodiment of the present invention.

Referring to FIG. 7, the multi-view video coding method in accordance with the embodiment of the present invention starts from a step S701. The video coding block 501 performs the inter and intra predictions to code a multi-view video at the step S701. The depth information video coding block 503 codes a depth information video corresponding to the multi-view video using one or more pieces of prediction information in accordance with the inter and intra predictions, at a step S703.

Hereafter, the step S703 will be described in detail.

The motion vector generation unit 505 generates a motion vector for the current frame of the depth information video using a reference frame, at a step S705. The identity decision unit 507 decides whether or not the motion vector in accordance with the inter prediction of the video coding block 501 is identical to the motion vector for the current frame, at a step S707. At this time, when a difference in frame rate or resolution between the video and the depth information video exists, the filter block may control the scales of the motion vectors in accordance with the inter prediction of the video coding block 501.

The flag bit coding unit 509 generates and codes a flag bit indicating the identity decision result at a step S709. The coding unit 509 codes the depth information video including the motion vector for the current frame depending on the flag bit, at a step S711. When it is decided at the step S707 that the identity between the motion vectors is not confirmed, the depth information video including the motion vector is coded at the step S711. On the other hand, when it is decided at the step S707 that the identity is confirmed, the depth information video excluding the motion vector is coded at the step S711.

In accordance with the embodiment of the present invention, the coding of the depth information video may be performed by using the prediction mode in accordance with the intra prediction which is generated at the step S701. More specifically, the prediction mode in accordance with the intra prediction, which is generated at the step S701, is transferred to the flag bit coding unit 509, and the flag bit coding unit 509 generates and codes a flag bit indicating whether or not to code the depth information video, using the prediction mode. The coding unit 509 performs the intra prediction in accordance with the prediction mode, and then codes the depth information video.

Figure 8:
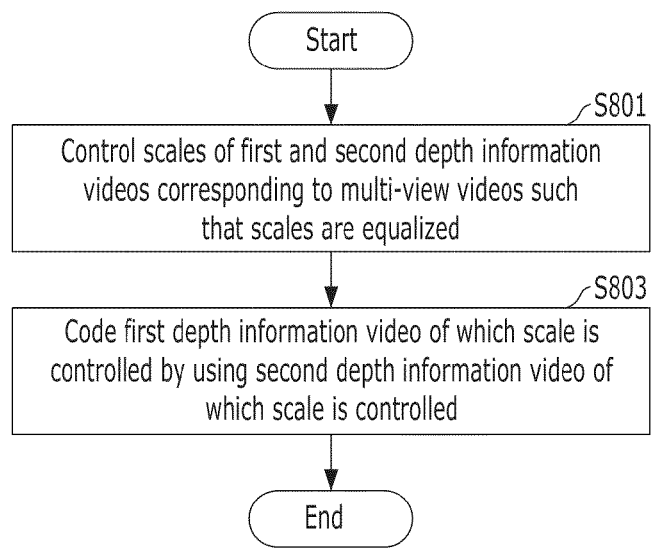
FIG. 8 illustrates a multi-view video coding method in accordance with another embodiment of the present invention.

FIG. 8 illustrates a multi-view video coding method in accordance with another embodiment of the present invention.

Referring to FIG. 8, the multi-view video coding method in accordance with the embodiment of the present invention starts from a step S801.

The scale control block 601 controls the scales of first and second depth information videos corresponding to multi-view videos such that the scales are equalized, at a step S801. This is because, when the first depth information video is referred to during the coding of the second depth information video, a difference in scale between the first and second depth information videos may cause an error.

The depth information video coding block 603 codes the second depth information video by referring to the first depth information video of which the scale is controlled at the step S801, at a step S803. At the step S801, the scales of two or more depth information videos may be controlled. At the step S803, two or more depth information videos of which the scales are controlled may be coded.

Figure 9:
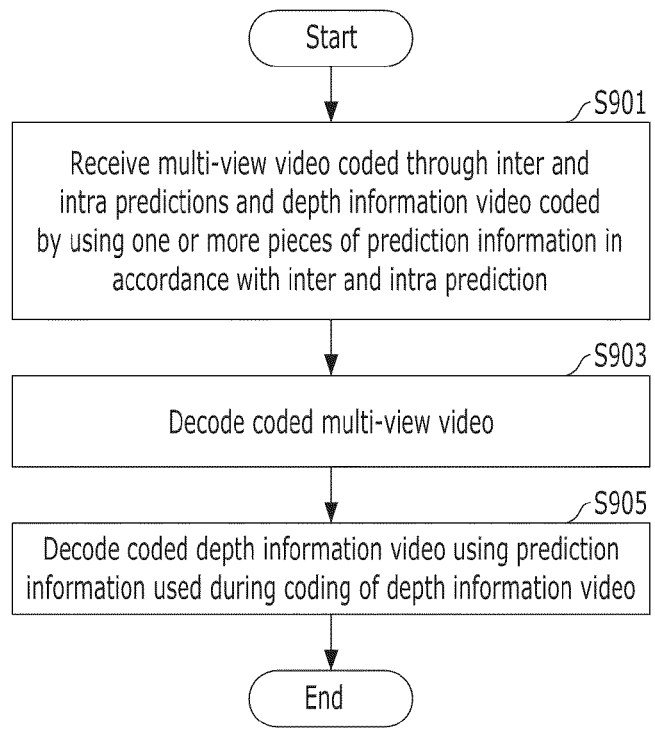
FIG. 9 illustrates a multi-view video decoding method in accordance with another embodiment of the present invention.

FIG. 9 illustrates a multi-view video decoding method in accordance with another embodiment of the present invention.

Referring to FIG. 9, the multi-view video decoding method in accordance with the embodiment of the present invention starts from a step S901.

At the step S901, a multi-view video coded through the inter and intra predictions and a depth information video coded by using one or more pieces of prediction information in accordance with the inter and intra predictions are received. That is, the video and the depth information video which are coded in accordance with the above-described embodiments of the present invention are received at the step S901. The coded multi-view video and the coded depth information video may be transmitted as one bit stream.

The coded multi-view video is decoded at a step S903. Then, the prediction information used during the coding of the depth information video is used to decode the coded depth information video, at a step S905. Since the prediction information in accordance with the coding of the multi-view video was used in the coding process of the depth information video, the prediction information in accordance with the coding of the multi-view video may be used at the step S905. At the step S905, the prediction information in accordance with the coding of the multi-view video may be used by referring to a flag bit generated in the coding process of the depth information video.

Furthermore, the decoding at the steps S903 and S905 may be performed in accordance with the H.264/AVC standard.

The multi-view video coding/decoding method and apparatus described above can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

The invention claimed is:

1. A multi-view video coding method comprising:
    coding a multi-view video by performing at least one of inter prediction and intra prediction; and
    coding a depth information video corresponding to the coded multi-view video using motion information of the coded multi-view video or prediction information in accordance with the at least one of inter prediction and intra prediction of the coded multi-view video,
    wherein a flag bit is inserted, and the flag bit indicates whether motion information for a current frame of the depth information video is identical to the motion information of the coded multi-view video and includes the prediction information in accordance with the at least one of inter prediction and intra prediction,
    wherein the motion information of the coded multi-view video is inherently used to code the depth information video,
    wherein the prediction information in accordance with the inter prediction comprises the motion information in accordance with the inter prediction,
    when the motion information for a current frame is identical to the motion information of the coded multi-view video, the flag bit is equal to 1,
    when the motion information for a current frame is not identical to the motion information of the coded multi-view video, the flag bit is equal to 0.

2. The multi-view video coding method of claim 1, wherein the prediction information in accordance with the intra prediction comprises an in-frame prediction mode in accordance with the intra prediction.

3. The multi-view video coding method of claim 2, wherein said coding a depth information video comprises:
    generating the motion information for the current frame of the depth information video using a reference frame, and deciding whether the motion information for the current frame is identical to the motion information in accordance with the inter prediction;
    generating and coding the flag bit based on the identity decision result; and
    coding the depth information video including the motion information for the current frame, when the flag bit is equal to 1.

4. The multi-view video coding method of claim 3, wherein the scale of the motion information in accordance with the inter prediction is controlled depending on a difference in resolution or frame rate between the video and the depth information video.

5. The multi-view video coding method of claim 2, wherein said coding a depth information video comprises:
    generating and coding the flag bit indicating whether or not to code the depth information video, using the prediction mode; and
    coding the depth information video by performing the intra prediction in accordance with the prediction mode.

6. A multi-view video coding method comprising:
    coding multi-view videos by performing at least one of inter prediction and intra prediction;
    controlling scales of a first depth information video and a second depth information video corresponding to the multi-view video such that the scales are equalized;
    coding the first depth information video corresponding to the coded multi-view video using motion information of the coded multi-view video or prediction information of the coded multi-view video; and
    coding the second depth information video, of which the scale is controlled, by referring to the first depth information video of which the scale is controlled,
    wherein a flag bit is inserted and the flag bit indicates whether motion information for a current frame of the first depth information video is identical to the motion information of the coded multi-view video and includes the prediction information in accordance with the at least one of inter prediction and intra prediction,
    wherein the motion information of the coded multi-view video is inherently used to code the depth information video, and
    wherein the prediction information in accordance with the inter prediction comprises the motion information in accordance with the inter prediction,
    when the motion information for a current frame is identical to the motion information of the coded multi-view video, the flag bit is equal to 1,
    when the motion information for a current frame is not identical to the motion information of the coded multi-view video, the flag bit is equal to 0.

7. A multi-view video coding apparatus comprising:
    a video coding block configured for coding a multi-view video through at least one of inter prediction and intra prediction; and
    a depth information video coding block for coding a depth information video corresponding to the multi-view video using motion information of the coded multi-view video or prediction information in accordance with the at least one of inter prediction and intra prediction information of the coded multi-view video, wherein a flag bit is inserted and the flag bit indicates whether a motion information for a current frame of the depth information video is identical to the motion information of the coded multi-view video, and indicates whether the prediction information in accordance with the at least one of inter prediction and intra prediction is used or not, wherein the motion information of the coded multi-view video is inherently used to code the depth information video, wherein the prediction information in accordance with the inter prediction comprises a motion information in accordance with the inter prediction, when the motion information for a current frame is identical to the motion information of the coded multi-view video, the flag bit is equal to 1, when the motion information for a current frame is not identical to the motion information of the coded multi-view video, the flag bit is equal to 0.

8. The multi-view video coding apparatus of claim 7, wherein the depth information video coding block comprises:
a motion information generation unit for generating the motion information for the current frame of the depth information video using a reference frame;
an identity decision unit for deciding whether or not the motion information for the current frame is identical to the motion information in accordance with the inter prediction;
a flag bit coding unit for generating and coding the flag bit based on the identity decision result; and
a coding unit for coding the depth information video including the motion information for the current frame, when the flag bit is equal to 1.

9. A multi-view video coding apparatus comprising:
a video coding block for coding a multi-view video through at least one of prediction and intra prediction;
a scale control block for controlling scales of a first depth information video and a second depth information video corresponding to multi-view videos such that the scales are equalized to each other; and
a depth information video coding block for coding the first depth information video corresponding to the coded multi-view video using motion information of the coded multi-view video or prediction information of the coded multi-view vide and the second depth information video, of which the scale is controlled, by referring to the first depth information video of which the scale is controlled, wherein a flag bit is inserted and the flag bit indicates whether motion information for a current frame of the first depth information video is identical to the motion information of the coded multi-view video and includes the prediction information in accordance with the at least one of inter prediction and intra prediction, wherein the motion information of the coded multi-view video is inherently used to code the depth information video, and wherein the prediction information in accordance with the inter prediction comprises the motion information in accordance with the inter prediction, when the motion information for a current frame is identical to the motion information of the coded multi-view video, the flag bit is equal to 1, when the motion information for a current frame is not identical to the motion information of the coded multi-view video, the flag bit is equal to 0.

10. A multi-view video decoding method comprising:
receiving a multi-view video coded through at least one of inter prediction and intra prediction, a depth information video which is coded by using motion information of the coded multi-view video or prediction information in accordance with the at least one of inter prediction and intra prediction of the multi-view video, and
a flag bit indicating whether the prediction information in accordance with the at least one inter prediction and intra prediction is used or not, and the flag bit indicates whether motion information for a current frame of the depth information video is identical to a motion information of the coded multi-view video, wherein the motion information of the coded multi-view video is inherently used to code the depth information video, wherein the prediction information in accordance with the inter prediction comprises the motion information in accordance with the inter prediction;
decoding the multi-view video; and
decoding the depth information video using the motion information or the prediction information used during the coding of the depth information video,
when the motion information for a current frame is identical to the motion information of the multi-view video, the flag bit is equal to 1,
when the motion information for a current frame is not identical to the motion information of the multi-view video, the flag bit is equal to 0.

* * * * *